IMAGE

(12) United States Patent
Ahlers et al.

(10) Patent No.: US 11,034,052 B2
(45) Date of Patent: Jun. 15, 2021

(54) MOUTHPIECE FOR EXTRUDING A MOLDING COMPOUND INTO A FORMED BODY, AND METHOD FOR PRODUCING A MOUTHPIECE OF THIS TYPE

(71) Applicant: Nanostone Water GmbH, Halberstadt (DE)

(72) Inventors: Daniel Ahlers, Quedlinburg (DE); Michael Leistner, Halberstadt (DE); Dagmar Wolff, Ditfurt (DE); Christian Goebbert, Eschau (DE); Bernd Koecher, Wegeleben (DE); Juergen Knopke, Brieskow-Finkenheerd (DE)

(73) Assignee: Nanostone Water GmbH, Halberstadt (DE)

( * ) Notice: Subject to any disclaimer, the term of this patent is extended or adjusted under 35 U.S.C. 154(b) by 259 days.

(21) Appl. No.: 15/558,160

(22) PCT Filed: Mar. 8, 2016

(86) PCT No.: PCT/EP2016/054859
§ 371 (c)(1),
(2) Date: Sep. 13, 2017

(87) PCT Pub. No.: WO2016/146428
PCT Pub. Date: Sep. 22, 2016

(65) Prior Publication Data
US 2018/0071952 A1    Mar. 15, 2018

(30) Foreign Application Priority Data
Mar. 13, 2015  (DE) .................... 10 2015 204 616.8

(51) Int. Cl.
*B28B 3/26*    (2006.01)
*B29C 48/11*   (2019.01)
(Continued)

(52) U.S. Cl.
CPC ............ *B28B 3/269* (2013.01); *B23P 15/243* (2013.01); *B29C 48/07* (2019.02); *B29C 48/11* (2019.02);
(Continued)

(58) Field of Classification Search
CPC ..... B28B 3/269; B29C 48/11; B29C 48/2566; B29C 48/25686; B29C 48/269; B29C 48/30; B29C 48/3003
See application file for complete search history.

(56) References Cited

U.S. PATENT DOCUMENTS 1,152,978 A  *  9/1915  Royle .................... B29C 48/30
                                             425/192 R
2,965,925 A  * 12/1960  Dietzsch, Sr. ........... D01D 5/24
                                             65/494
(Continued)

FOREIGN PATENT DOCUMENTS

CN        1491149      4/2004
CN      103717365      4/2014
(Continued)

OTHER PUBLICATIONS

Chinese Office Action for corresponding Application No. 201680013109.6, dated Oct. 24, 2018, pp. 1-6.
(Continued)

*Primary Examiner* — Xiao S Zhao
*Assistant Examiner* — Joseph S Leyson
(74) *Attorney, Agent, or Firm* — Fish & Richardson P.C.

(57) ABSTRACT

A mouthpiece (10) for extruding a molding compound into a formed body which has internal channels, comprises: a mouthpiece frame (14) with a frame opening (16); a first core retaining plate (22) which is fastened in the area of an upstream end of the frame opening (16) when viewed in the flow direction (15) of the molding compound; and a plurality (Continued)

of longitudinal cores (28) which are axially and laterally held by an upstream end section (26) on the first core retaining plate (22). It is proposed that, furthermore, it comprises a second core retaining plate (36) which is loosely arranged downstream of the first core retaining plate (22) relative to the mouthpiece frame (14) in the flow direction (15), and in which the areas (32) of the cores (28) farther from the upstream end section (26) are arranged to be radially fixed but axially loose.

20 Claims, 8 Drawing Sheets

(51) Int. Cl.
  *B29C 48/30* (2019.01)
  *B29C 48/25* (2019.01)
  *B23P 15/24* (2006.01)
  *B29C 48/07* (2019.01)
  *B29C 48/12* (2019.01)

(52) U.S. Cl.
  CPC .......... *B29C 48/12* (2019.02); *B29C 48/2566* (2019.02); *B29C 48/25686* (2019.02); *B29C 48/269* (2019.02); *B29C 48/3003* (2019.02)

(56) References Cited

U.S. PATENT DOCUMENTS

| | | | | |
|---|---|---|---|---|
| 3,357,051 A | * | 12/1967 | Zolotarevsky | B29C 48/11 425/464 |
| 3,778,217 A | * | 12/1973 | Bustamante | A23G 3/2015 425/467 |
| 4,290,743 A | * | 9/1981 | Suzuki | B28B 3/269 264/177.12 |
| 5,942,260 A | * | 8/1999 | Kodama | B28B 3/269 425/190 |
| 6,343,923 B1 | * | 2/2002 | Cunningham | B28B 3/269 425/190 |
| 8,096,799 B2 | * | 1/2012 | Wallen | B29C 48/267 425/192 R |
| 2008/0124423 A1 | | 5/2008 | Peterson et al. | |
| 2015/0008625 A1 | * | 1/2015 | Sato | B29C 48/30 264/630 |

FOREIGN PATENT DOCUMENTS

| | | |
|---|---|---|
| DE | 1806351 A1 | 5/1970 |
| DE | 9003642 U1 | 8/1990 |
| DE | 29509666 U1 | 10/1995 |
| DE | 202011108664 U1 | 5/2013 |
| EP | 0374821 A2 | 6/1990 |
| EP | 2230057 | 9/2010 |
| EP | 2602078 A1 | 6/2013 |
| EP | 2602079 A2 | 6/2013 |
| EP | 2735412 A1 | 5/2014 |
| EP | 2735413 A1 | 5/2014 |
| EP | 2743049 A1 | 6/2014 |
| EP | 2602078 B1 | 9/2014 |
| JP | H071424 A | 1/1995 |
| WO | 2014085355 A1 | 6/2014 |

OTHER PUBLICATIONS

English Translation of Chinese Office Action for corresponding Application No. 201680013109.6, dated Oct. 24, 2018, pp. 1-7.
Patent Cooperation Treaty, International Searching Authority, Search Report and Written Opinion for PCT/EP2016/054859, 9 pages, dated Jul. 1, 2016.

* cited by examiner

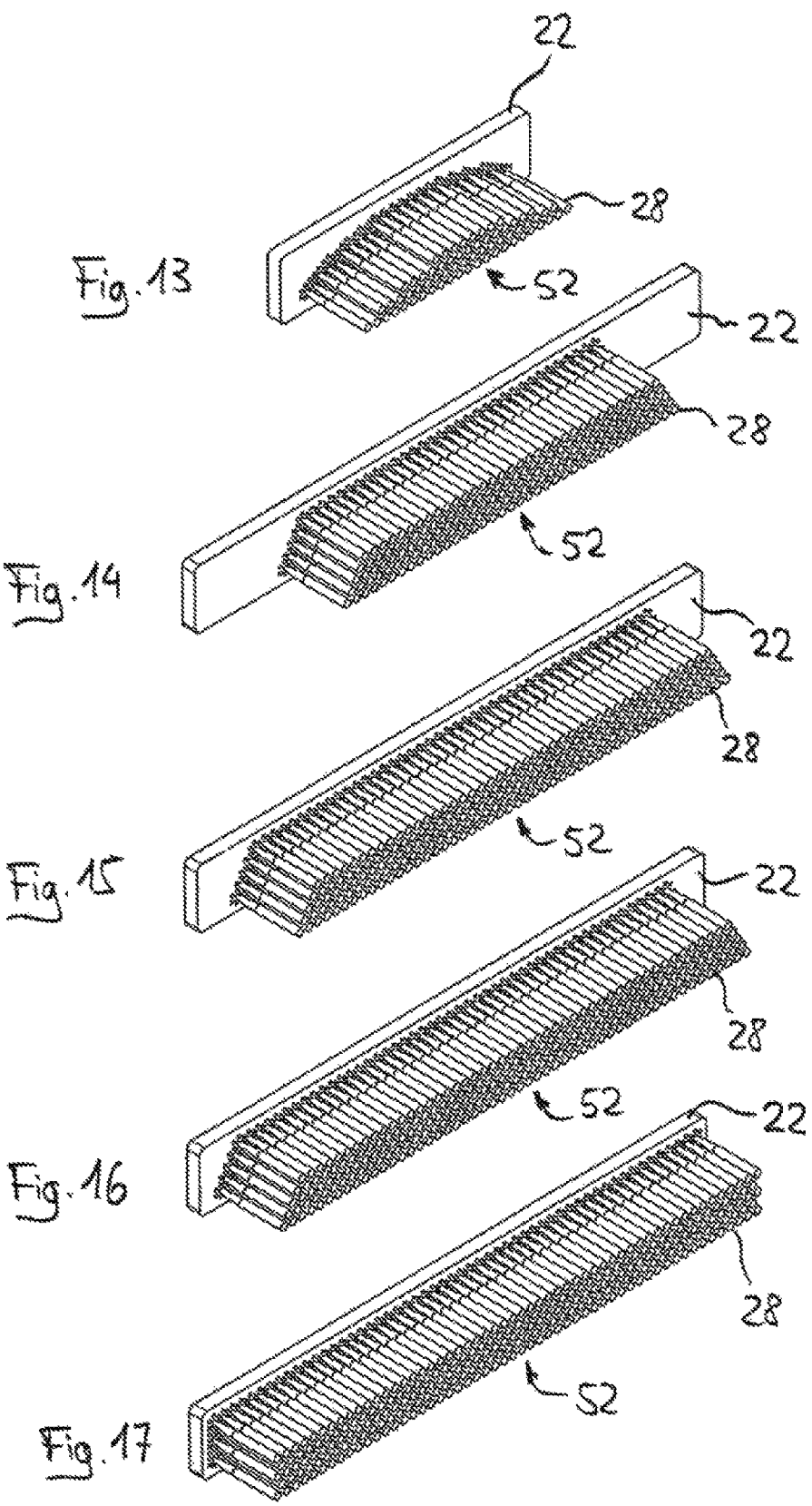

MOUTHPIECE FOR EXTRUDING A MOLDING COMPOUND INTO A FORMED BODY, AND METHOD FOR PRODUCING A MOUTHPIECE OF THIS TYPE

CROSS REFERENCE TO RELATED APPLICATIONS

This application is a 371 of International Application No. PCT/EP2016/054859 that was filed on Mar. 8, 2016, which claims priority to German Application No. 10 2015 204 616.8 that was filed on Mar. 13, 2015. The entire content of the applications referenced above are hereby incorporated by reference herein.

FIELD OF THE INVENTION

The invention relates to a mouthpiece for extruding a molding compound into a formed body. A subject matter of the present invention, furthermore, is a corresponding production method.

BACKGROUND OF THE INVENTION

From DE 20 2011 108664 U1, a mouthpiece is known for producing formed bodies which are provided with hollow cavities and made of ceramic compounds. In order to prevent the cores from moving during the extrusion, they are connected to one another via connection elements.

The disadvantage of this device known from the prior art is that the formed body obtained after the extrusion is not reliably formed of one piece. Therefore, the aim of the present invention is to produce a mouthpiece by means of which a single-piece formed body which has internal channels can be produced reliably.

SUMMARY OF THE INVENTION

This aim is achieved by a mouthpiece having for extruding a molding compound into a formed body which has internal channels. The mouthpiece comprises: a mouthpiece frame with a frame opening; a first core retaining plate which is fastened in the area of an upstream end of the frame opening when viewed in the flow direction of the molding compound; and a plurality of longitudinal cores which are axially and laterally held by an upstream end section on the first core retaining plate. The mouthpiece further comprises a second core retaining plate which is loosely arranged downstream of the first core retaining plate relative to the mouthpiece frame in the flow direction, and in which the areas of the cores farther from the upstream end section are arranged to be radially fixed but axially loose. A method for producing such a mouthpiece is indicated in the coordinate method claim. Advantageous developments of the invention can be found in the dependent claims. Furthermore, features of the invention are indicated in the subsequent description and in the drawing, wherein these features can be used both individually and also in quite diverse combinations.

In the mouthpiece according to the invention, it is ensured that the molding compound can be led unimpeded over a sufficiently long path distance, whereby the possibility of connecting the individual strands of the molding compound to one another is provided, whereby a single-piece formed body is produced. This is achieved in that no elements that divide the molding compound are present on the path distance from the outlet from the first core retaining plate to the outlet of the mouthpiece.

Nevertheless, in the mouthpiece according to the invention, the cores are held reliably in position, since they are held reliably not only by means of the upstream end sections thereof in the first core retaining plate, but also by means of the downstream end sections thereof in the second core retaining plate, to the extent that they are radially fixed there. However, this is the case only at the beginning of the extrusion process, since, according to the invention, it was recognized that it is only during this operating phase that there is a risk that the core can be pushed laterally or radially away from the desired position thereof by the molding compound. As soon as the start of the molding compound reaches the second core retaining plate, the latter is pushed away in flow direction of the molding compound by the downstream end sections of the cores in the axial direction thereof, since the areas of the cores father from the upstream end section are just arranged loosely relative to the second core retaining plate. The second core retaining plate is removed as soon as the beginning of the extruded formed body has come out of the mouthpiece. Accordingly, the second core retaining plate is cleaned and reused for the next extrusion process.

To that extent, the second core retaining plate thus is a "startup aid," by means of which, during the particularly critical phase of the beginning of the extrusion process, the cores are retained reliably in position, but which, during the further course of the extrusion process, is simply pushed away and thus does not impede the extrusion.

A development is characterized in that the first core retaining plate is arranged at an upstream end of the frame opening, and the second core retaining plate is arranged at a downstream end of the frame opening. In this manner, a compact unit is produced, which can be handled easily on the extrusion device.

Furthermore, it is possible that the cores are rigidly connected, preferably glued, to the first core retaining plate. This makes it possible for the cores to maintain the desired orientation and position thereof particularly reliably during operation.

It is also proposed that the second core retaining plate comprises a plurality of second core receiving openings, in which the areas of the cores farther from the upstream end section are received with sliding fit or with radial play. As a result, a very simple radial securing but axially loose mounting of the areas of the core father from the upstream end sections on the second core retaining plate is implemented.

In addition, according to the invention, the second core retaining plate has a flange section adjoining the mouthpiece frame on the outside and an introduction section which is complementary to said frame opening and introduced into it. In this manner, the second core retaining plate is initially positioned exactly on the mouthpiece frame. It is understood that the attachment of the second core retaining plate on the mouthpiece frame is loose, so that, during operation, the second core retaining plate can be detached by the molding compound from the mouthpiece frame.

A development is characterized in that, on the upstream end, the frame opening comprises a step by means of which a receiving section is defined, in which the first core retaining plate is received. In this manner, it is possible to virtually countersink the first core retaining plate in the mouthpiece frame in such a manner that it is flush on the outside, whereby the connection of the mouthpiece to the extrusion device is facilitated.

Furthermore, thereby, an exact and reproducible positioning of the first core retaining plate on the mouthpiece frame is ensured.

It is also possible that the core retaining plate has a plurality of molding compound passage openings arranged around a holding section, in particular around a first core receiving opening, of a respective core, mold compound passage openings which have an opening cross section that tapers as viewed in flow direction of the molding compound. As a result, the entrance of the molding compound into the mouthpiece is facilitated.

It is also proposed that the core retaining plate has a plurality of molding compound passage openings arranged around a holding section, in particular around a first core receiving opening, of a respective core, wherein the molding compound passage openings which are arranged relatively close to an edge of the core retaining plate have a smaller cross-sectional area than molding compound passage openings arranged relatively far from an edge of the core retaining plate.

The molding compound passage openings, also referred to as feed bores, can have, for example, in an inner area of the first core retaining plate, a diameter of 1.8 mm and, in an outer area of the first core retaining plate, a diameter of 1.2 mm. By means of these different dimensions, the flow conditions can be considerably influenced and optimized. With equal diameters, the molding compound would flow faster in the area close to the edge of the first core retaining plate, since more space is available. In the area farther from the edge, on the other hand, the molding compound would flow more slowly, since it would first have to "squeeze" through the narrow spaces between the cores before it could exit from the mouthpiece. Due to the smaller feed bores in the area close to the edge of the first core retaining plate, the molding compound is virtually "braked" there and can exit at the same time with the molding compound passing through the inner feed bores.

Other known errors, such as the "bow error" (the extruded segment is bowed) or "waviness" (the extruded segment is wavy), which arise from different flow conditions, are remedied or at least improved thereby. Overall, by means of this measure, the quality of the formed bodies produced is considerably improved.

In addition, according to the invention, the cores, at least in certain sections are conical, in such a manner that their cross-sectional area is increased when viewed in flow direction of the molding compound. Thereby, the flow behavior of the molding compound during the extrusion process is also considerably improved, and thus the quality of the formed bodies produced is optimized.

According, to the invention, the cores can have a round polygonal, in particular triangular, quadrangular, pentagonal or hexagonal, square or flat rectangular or trapezoidal cross section. A round cross section is very easy to fabricate. Polygonal cross section shapes have the advantage that they can be arranged in such a manner that the wall thickness between the channels within the formed bodies produced is regular, so that when the molded body produced from the blank is a filter element, a regular and optimal filtration can be achieved. Moreover, an elliptical, ovoid or stellate or even a free-form cross section would also be possible.

It is also proposed that the cores are arranged on the first core retaining plate within a section, preferably distributed regularly within this section, which, in top view, is at least roughly circular, circular segment-shaped, trapezoidal or rectangular. If the extrusion opening has a corresponding outer contour, then circular, circular segment-shaped, trapezoidal or rectangular formed bodies can be produced in this manner. From circular segment-shaped, trapezoidal and/or rectangular formed bodies, molded bodies can be produced which form so-called "flat membranes," which overall can be put together to form a filtration device having a round outer contour. However, using the indicated cross sections, it is also possible to compose almost any desired outer contours for a filtration device.

The method according to the invention for producing a mouthpiece according to any one of the preceding claims is characterized in that it comprises the following steps: attaching the first core retaining plate to the upstream end of the frame opening; inserting the upstream ends of the cores into the first core receiving openings of the first core retaining plate; attaching the second core retaining plate to the downstream end of the frame opening, and in the process, introducing the downstream ends of the cores into the second core receiving openings of the second core retaining plate; and gluing the upstream ends of the cores into the first second core receiving openings. In this manner, the above-mentioned cores glued to the first core retaining plate can be implemented particularly simply. To that extent, the second core retaining plate has a dual function: on the one hand, it ensures an alignment of the cores at the time of the gluing into the first core retaining plate, and, on the other hand, it ensures a stable radial holding of the cores during the initial phase of the extrusion process.

BRIEF DESCRIPTION OF THE DRAWINGS

Below, an embodiment of the invention is explained m reference to the appended drawing. In the drawing:

FIGS. 13-17 show perspective diagrammatic representations of arrangements of cores on the first core retaining plate.

DETAILED DESCRIPTION OF THE INVENTION

Figure 1:
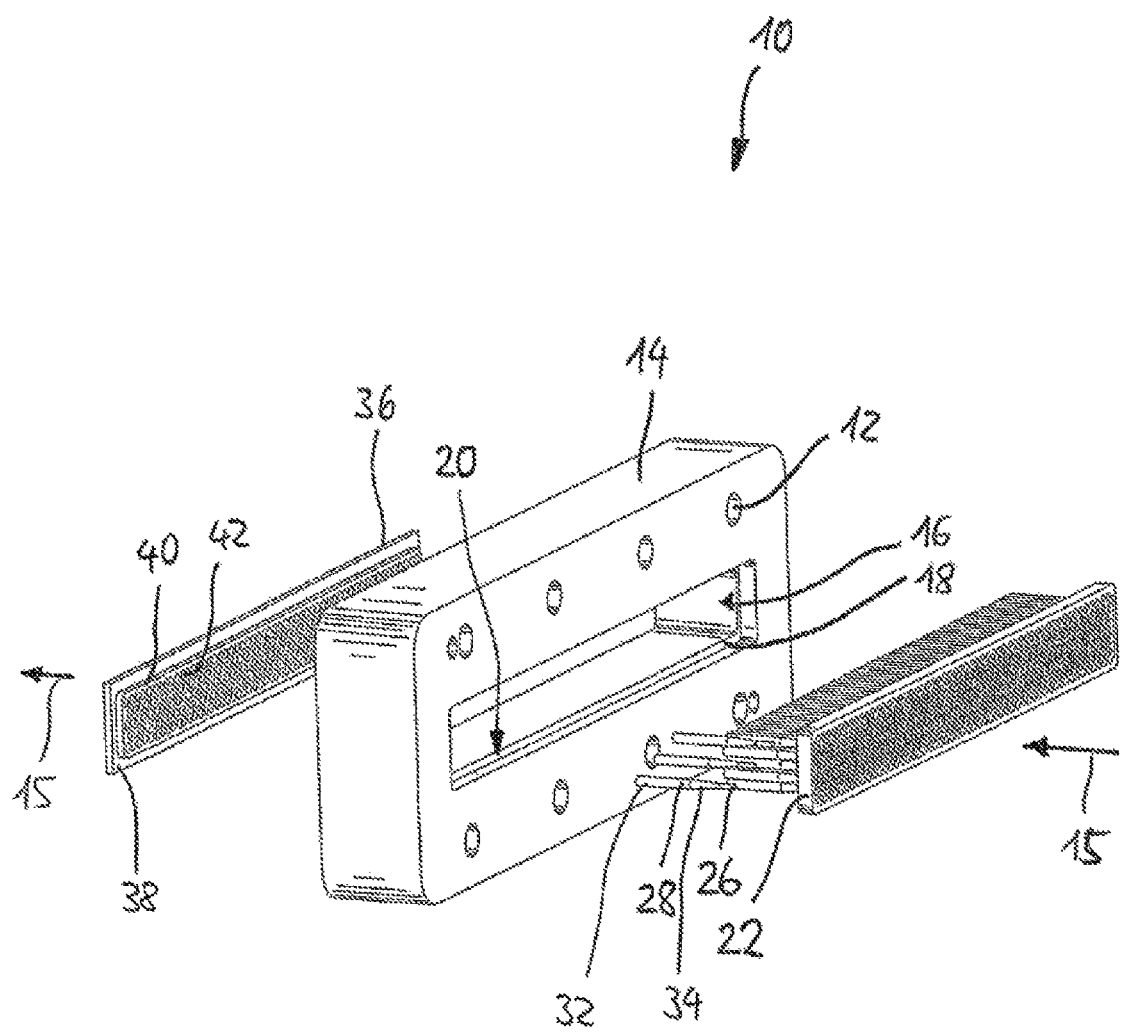
FIG. 1 shows an exploded perspective representation of a mouthpiece with a mouthpiece frame, a first core retaining plate, a second core retaining plate, and a plurality of cores.

Here, it is pointed out that not all the reference numerals are recorded in all the figures in order to simplify the view.

In FIG. 1, a mouthpiece overall bears reference numeral 10. It is used for fastening on an extrusion device, which is not represented. As represented in detail further below, the mouthpiece 10 is used for extruding a molding compound into a formed body which has internal channels. The flow direction of the molding compound during the extrusion process is shown in the figures with an arrow 15.

The fastening of the mouthpiece 10 on the extrusion device occurs by means of screws which are screwed into holes 12 in a mouthpiece frame 14 of the mouthpiece 10. The mouthpiece frame 14 has an elongate, flat frame opening 16 which, during the extrusion process, forms a channel for forming the formed body. At the upstream end thereof when viewed in the direction of the arrows 15, the mouthpiece frame opening in turn has a step 18, by means of which a receiving section 20 is defined, in which a first core retaining plate 22 of the mouthpiece 10 is received.

Figure 2:
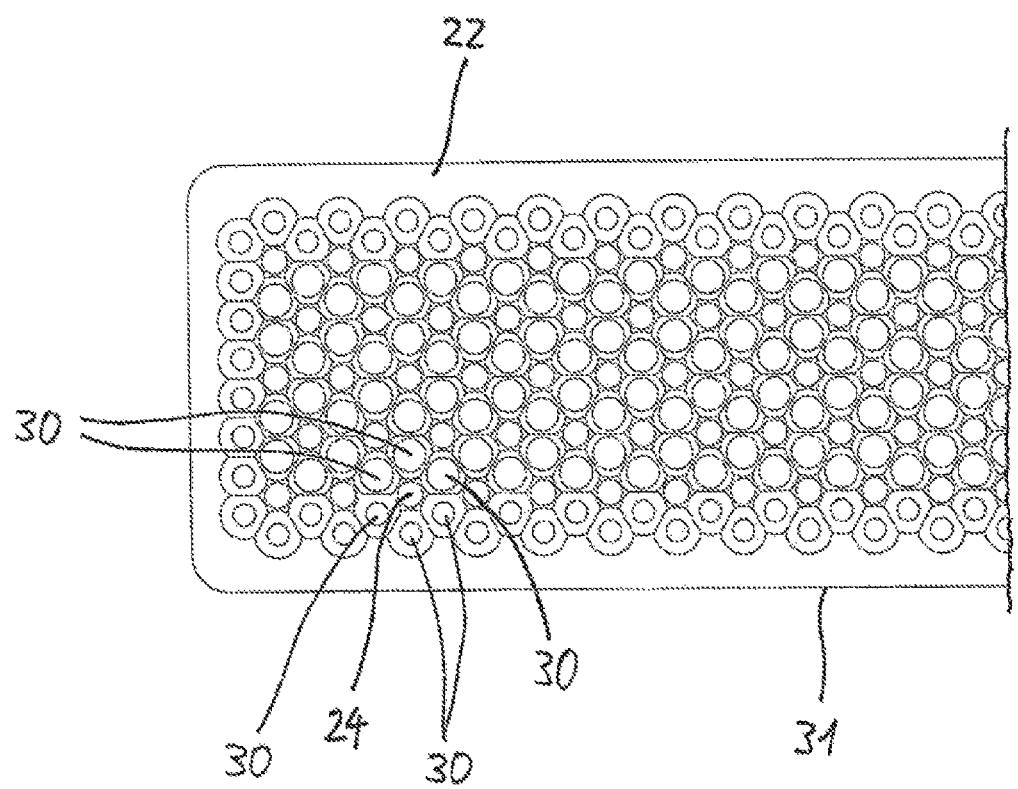
FIG. 2 shows an enlarged top view onto the first core retaining plate of FIG. 1.

As can be seen particularly in FIG. 2, the first core retaining plate 22 has a plurality of first holding sections 24 which in the case at hand are formed as first core receiving openings. Into the first core receiving openings 24, the upstream cylindrical end sections 26 of rod-shaped cores 28 are inserted and rigidly connected by gluing to the first core retaining plate 22 and thus to that extent are held axially and radially rigidly on the first core retaining plate 22.

As can also be seen particularly from FIG. 2, several molding compound passage openings 30 are arranged around a core receiving opening 24. Here, the molding compound passage openings 30 which are adjacent to an edge 31 of the mouthpiece frame 14 have a smaller diameter and thus a smaller cross-sectional area than the molding compound passage openings 30 which are not adjacent to the edge 31 of the mouthpiece frame 14 but rather are arranged farther from said edge.

While not apparent from the drawing, the design in fact is such that the molding compound passage openings 30 have a tapering opening cross section when viewed in flow direction 15 of the molding compound.

From FIG. 1 it is moreover apparent that the cores 28 have three different diameter sections when viewed in the longitudinal direction of the cores. The cores have, on the one hand, the upstream end section 26 already mentioned above, which is cylindrical with a relatively small diameter, and, on the other hand, a downstream end section 32, which is also cylindrical and has a relatively large diameter, and, arranged between these two sections 26 and 32, a conical transition section 34 along which the cross-sectional area of a core 28 increases when viewed in flow direction 15 of the molding compound.

As can be seen from FIGS. 1 and 2, the first core retaining plate 22 has a plurality of core receiving openings 24, and accordingly the mouthpiece 10 has a plurality of cores 28.

It is easy to see in FIG. 1 that the first core retaining plate 22 has an outer shape and thickness complementary to the inner shape of the receiving section 20 of the frame opening 16, so that the first core retaining plate 22 can be introduced into the receiving section 20 of the frame opening 16, where it is arranged flush with the front surface of the mouthpiece frame 14, on the right in FIG. 1. To that extent, the first core retaining plate 22 is arranged at an upstream end of the frame opening 16.

At a downstream end of the frame opening 16, a second core retaining plate 36 is present. As can be seen both from FIG. 1 and also from FIGS. 3 to 6, the second core retaining plate 36 has a flange section 38 which extends transversely to the flow direction 15 and, in the installed position, adjoins the mouthpiece frame 14 on the outside. Furthermore, the second core retaining plate 36 has an introduction section 40 which is complementary to the frame opening 16 and which, in the installed position, is introduced into the frame opening 16. The introduction section 40 is dimensioned, compared to the frame opening 16, so that the second core retaining plate 36, in the installed position, is received in the frame opening 16 with a certain play and to that extent is arranged loosely relative to the mouthpiece frame 14.

In the second core retaining plate 36, a plurality of second core receiving openings 42 is present. These second core receiving openings are arranged in the second core retaining plate 36 so that, in the installed position, they are aligned precisely with the first core receiving openings 20 in the first core retaining plate 22. The second core receiving openings 42 are dimensioned, relative to the downstream end sections 32 of the cores 28, so that the downstream end sections 32 of the cores 28 farther from the upstream end sections 26 are received in these second core sections 32 of the cores 28 are indeed radially fixed but axially arrange loosely in the second core retaining plate 36.

Thus, both the upstream end sections 26 and also the downstream end sections 32 of the cores 28 are radially fixed. Since, due to gluing in the first core retaining plate 22, the cores 28 are also axially fixed, they are overall held immovably in the mouthpiece frame 14, at least when the second core retaining plate 36 is inserted.

In order to be able to glue the cores 28 in the first core retaining plate 22, they are first inserted into the first core receiving openings 24 in the first core retaining plate 22, and the mouthpiece 10 consisting of mouthpiece frame 14, first core retaining plate 22, cores 28 and second core retaining plate 36 is assembled. It is only then that the upstream end sections 26 are glued.

Figure 3:
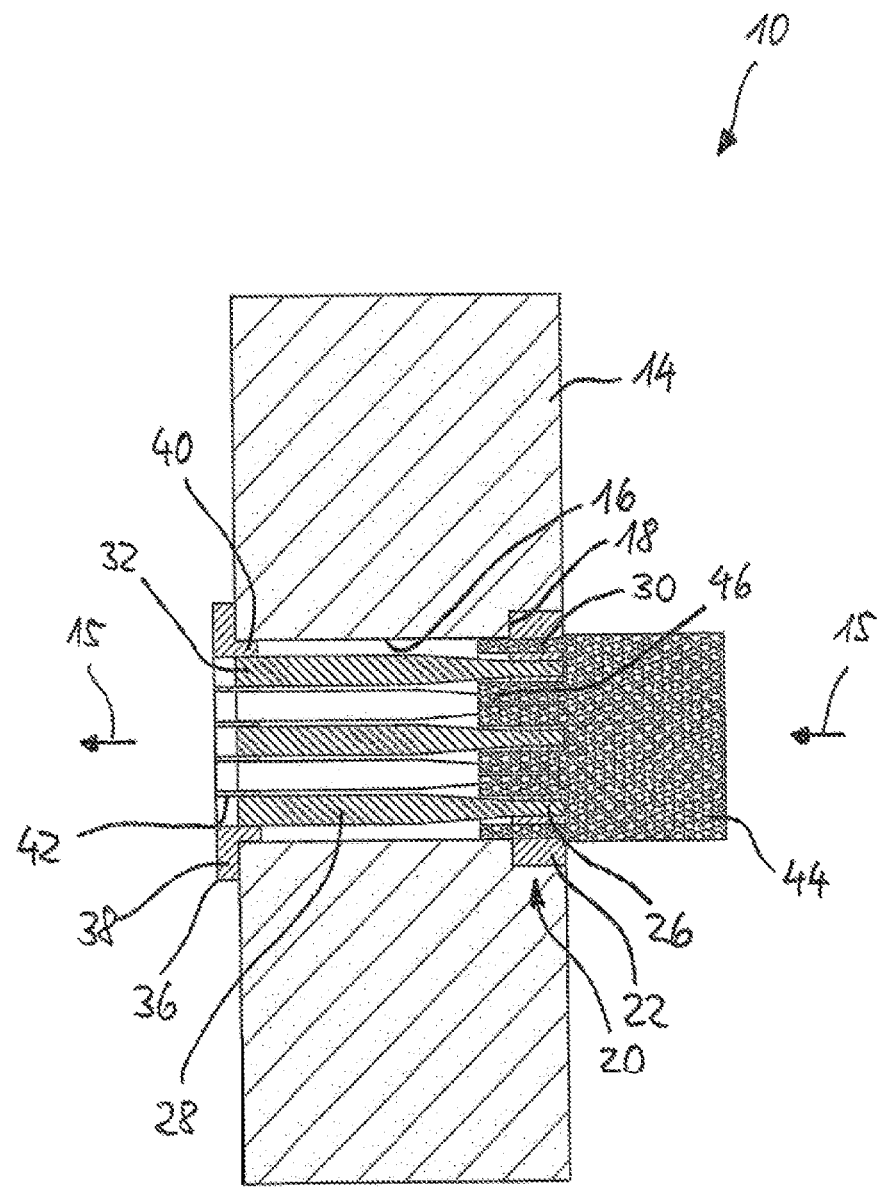
FIG. 3 shows a section through the mouthpiece of FIG. 1 at a first time point during an extrusion process.

In reference to FIGS. 3 to 6, a typical extrusion process will now be described, which uses the mouthpiece 10 shown in FIGS. 1 and 2: first, via the extrusion device, a molding compound 44 (for example, a ceramic material) is conveyed in flow direction 15 against the mouthpiece 10. Through the conical molding compound passage openings 30, it enters the first core retaining plate 22 and exits again therefrom in the interior of the frame opening 16 in the mouthpiece frame (14) (FIG. 3). In FIG. 3, one can see that, due to the bridges (without reference numerals) present between the molding compound passage openings 30 of the first core retaining plate 22, the molding compound 44 is still divided immediately after the exit from the first core retaining plate 22, since gaps 46 are present.

Figure 4:
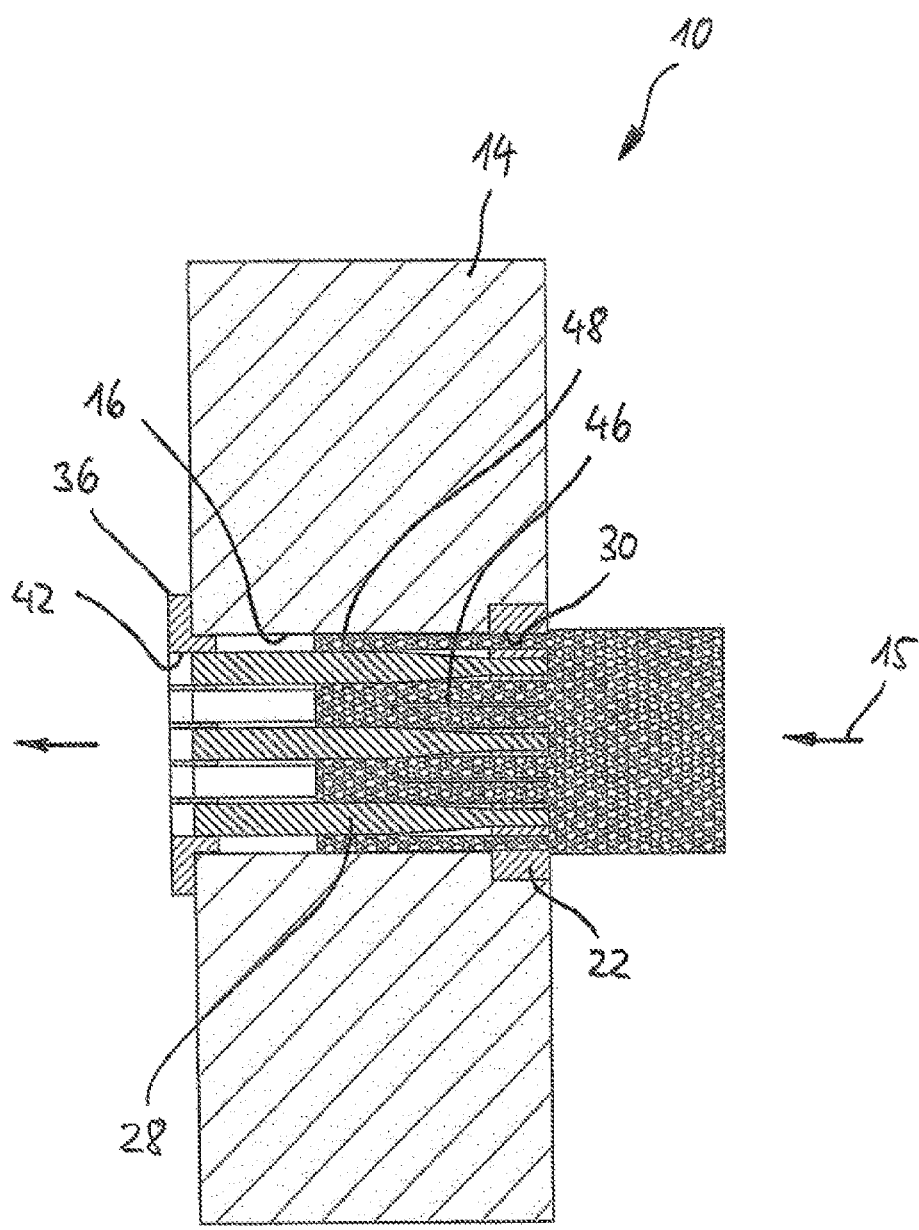
FIG. 4 shows a representation similar to FIG. 2 at a second time point during the extrusion process.

In FIG. 4, one can see that, in the course of the extrusion process, the molding compound 44 is driven farther into the frame opening 16 of the mouthpiece frame 14. One can see that, during the further course of the path distance through the frame opening 16, the gaps 46, which are still present on the first path distance through the frame opening 16, close and thus are no longer present. Thus, now a single-piece formed body 48 has formed.

Figure 5:
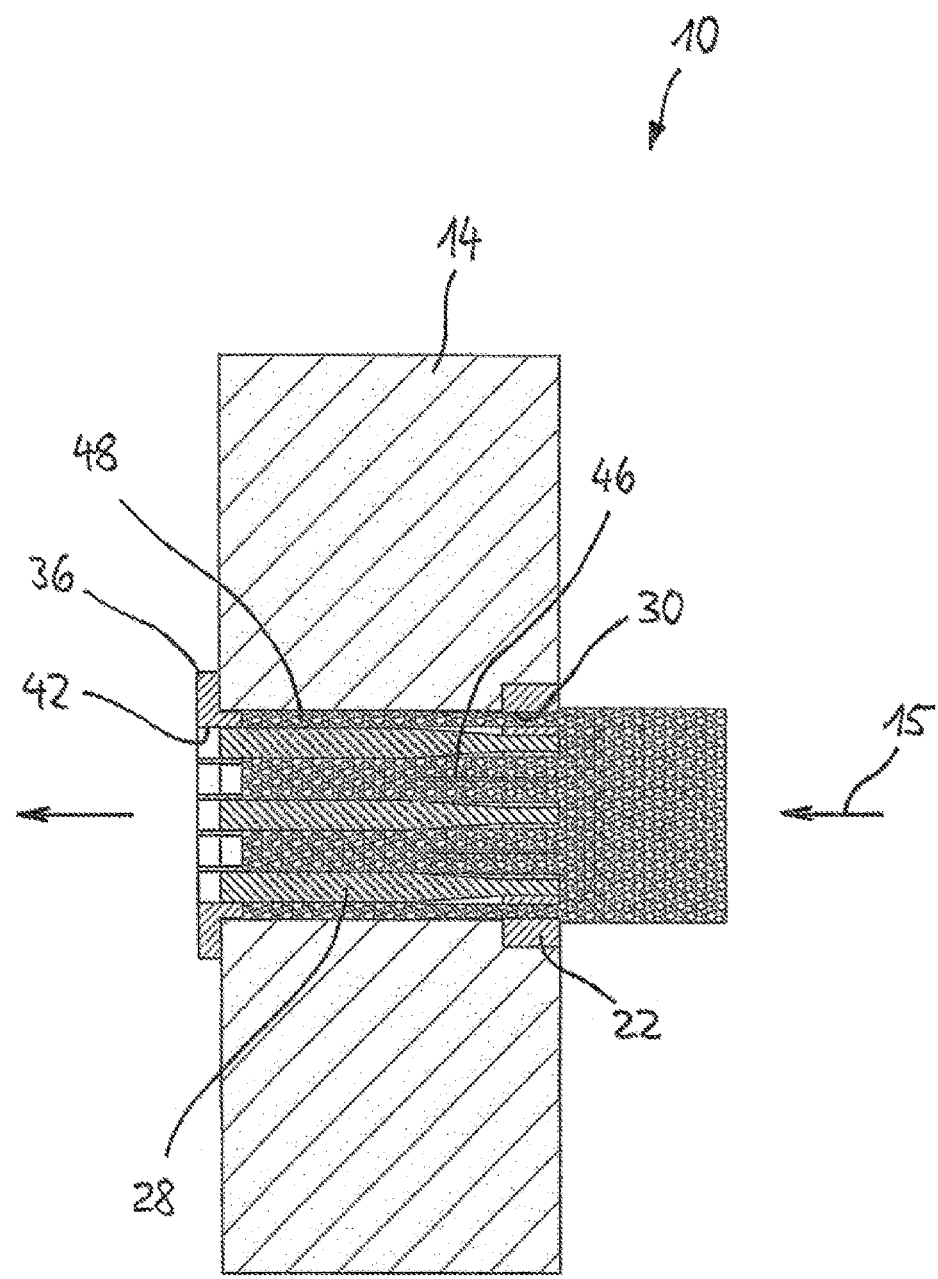
FIG. 5 shows a representation similar to FIG. 2 at a third time point during the extrusion process.
Figure 6:
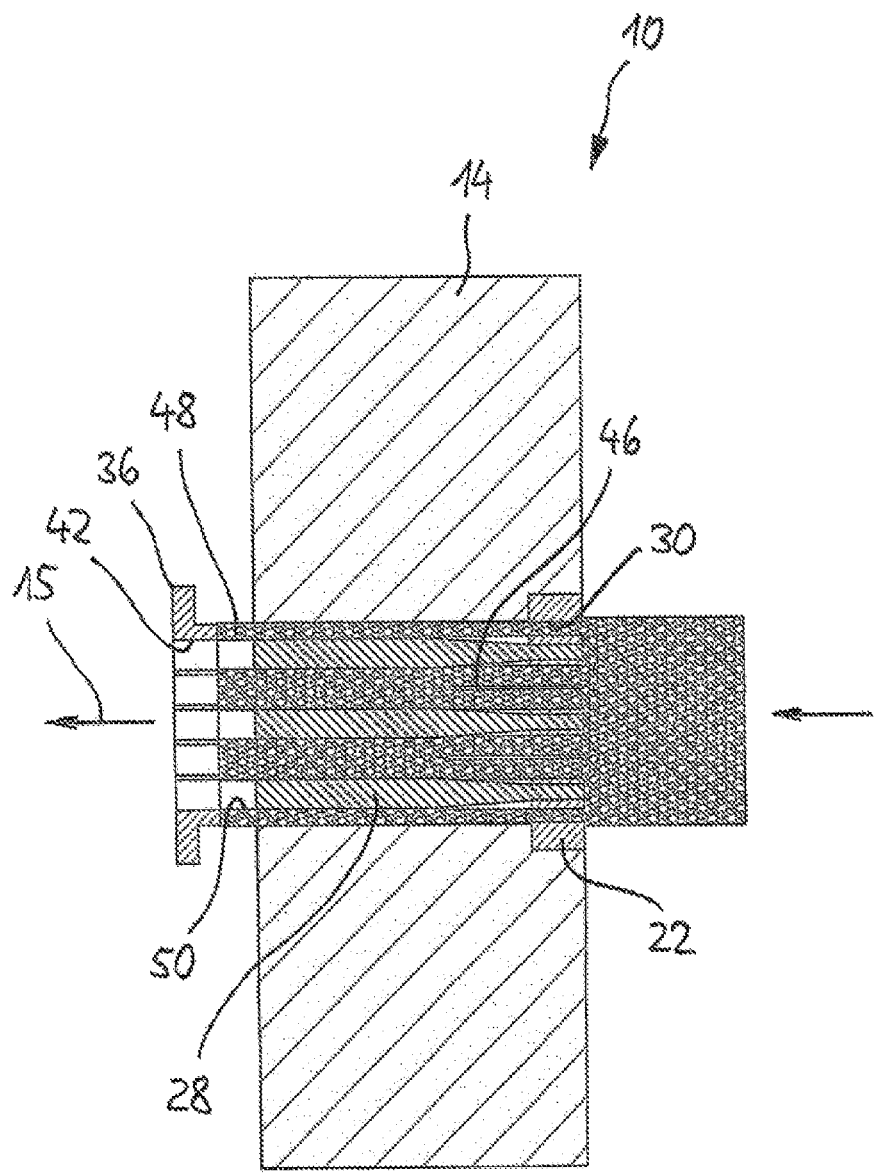
FIG. 6 shows a representation similar to FIG. 2 at a fourth time point during the extrusion process.
Figure 7:
FIGS. 7-12 show perspective diagrammatic representations of different embodiments of cores.
Figure 8:
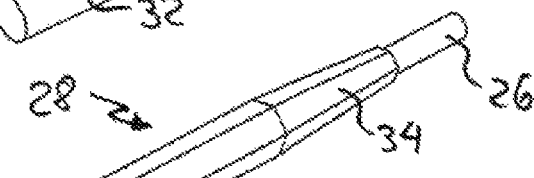
Figure 9:
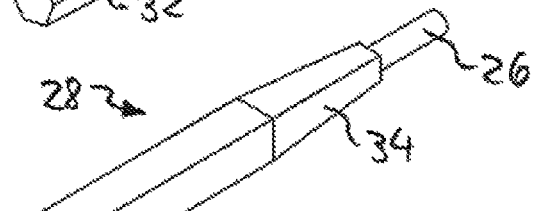
Figure 10:
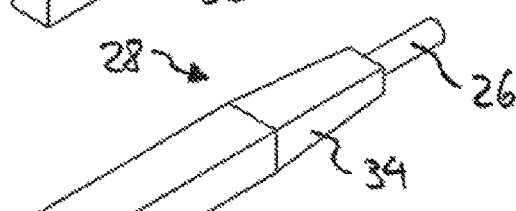
Figure 11:
Figure 12:

In FIG. 5, one can see how, during the course of the further advance through the frame opening 16, the end of the formed body 48, which is on the left in FIG. 5, reaches the second core retaining plate 36. In spite of the high pressure that the molding compound 44 of the formed body 48 exerts in radial direction onto the cores 28, said cores remain in the fixed position thereof due to the fixing thereof.

By means of the extrusion process, the molding compound 44 is moved further through the frame opening 16. The second core holding plate 36, which is only loosely inserted into the frame opening 16 and placed loosely onto the downstream end sections 32 of the cores 28, is now pushed away from the cores 28 and from the mouthpiece frame 14 by the molding end sections 32 of the cores 28 are in fact now no longer held radially. But this is also no longer necessary in this phase of the extrusion process.

As described, single-piece gap-free formed bodies 48 can be produced, which have internal channels (reference numeral 50 in FIG. 6), since the molding compound 44 can flow undisturbed and unimpeded over the entire path distance from the outlet from the first core retaining plate 22 to the downstream end of the frame opening 16. Such a formed body can be used, for example, for producing a so-called filter membrane which is used for filtering fluids.

FIGS. 7-12 show different embodiments of cores 28. Here, in FIG. 7, a core 28 with circular cross section is represented, as used in the mouthpiece 10 of FIGS. 1-6. Figure shows a core 28 with a hexagonal, that is to say a hexangular cross section, as could be used in the device 10 of FIGS. 1-6. A core 28 with square cross section, corresponding to FIG. 9, could be used with the mouthpiece 10 of FIGS. 1-6. The same also applies to the core 28 of FIG. 11, which has a triangular cross section having triangle sides of equal length. The rectangular cross section of the core 28 of FIG. 10 as well as the trapezoidal core 28 of FIG. 12, on the other hand, would require a different distribution of the cores 28 over the first core retaining plate 22.

According to FIG. 13, the cores 28 are arranged on the first core retaining plate 22 within a section 52, namely arranged regularly distributed within this section 52, which is circular segment-shaped in top view. According to FIGS. 14, 15 and 16, the cores 28 are arranged on the first core retaining plate 22 within a section 52, again regularly distributed within this section 52, which is trapezoidal in the top view. Here, the width of the trapezoidal section 52 increases from FIG. 14 to FIG. 16, while the height remains the same. In the core retaining plate 22 of FIG. 17, the cores 28 are arranged regularly distributed within a section 52, wherein the section 52 is rectangular in the top view.

The width of the circular segment-shaped section 52 of FIG. 13 is slightly smaller than the upper width of the trapezoidal section 52 of FIG. 14. The lower width thereof again is slightly smaller than the upper width of the trapezoidal section 52 of FIG. 15. The lower width thereof again is slightly smaller than the upper width of the trapezoidal section 52 of FIG. 16. The width of the rectangular section 52 of FIG. 17 is slightly larger than the lower width of the trapezoidal section 52 of FIG. 16.

In a corresponding design of the extrusion opening, formed bodies can thus be extruded which have a circular segment-shaped, trapezoidal and rectangular outer contour, and in which the channels produced by the cores 28 are arranged regularly distributed over the entire cross section of the formed body. By means of the shown outer contours of the formed bodies, so-called "flat membranes" can be produced, for example, which can be arranged within a tubular housing so that this tubular housing is filled to the maximum extent with flat membranes, wherein fluid spaces are present between the flat membranes.

It is understood that many and any other outer contours of formed bodies with contours of sections 52 can be produced, including also, for example, irregular free-form contours.

The invention claimed is:

1. A mouthpiece for extruding a molding compound into a formed body which has internal channels, wherein the mouthpiece comprises:
   a mouthpiece frame with a frame opening, the frame opening having an upstream end and a downstream end opposite the upstream end;
   a first core retaining plate;
   a plurality of longitudinal cores, each longitudinal core having an upstream end and a downstream end opposite its upstream end, the upstream end of each longitudinal core being axially and laterally held by the first core retaining plate; and
   a second core retaining plate,
   wherein:
      the mouthpiece frame is between the first and second core retaining plates;
      the downstream end of each longitudinal core is radially fixed by the second core retaining plate; and
      the second core retaining plate is axially movable relative to the longitudinal cores by the molding compound during extrusion.

2. The mouthpiece according to claim 1, wherein the second core retaining plate is arranged on the downstream end of the frame opening.

3. The mouthpiece according to claim 1, wherein the longitudinal cores are rigidly connected to the first core retaining plate.

4. The mouthpiece according to claim 1, wherein:
   the second core retaining plate comprises a plurality of openings; and
   the downstream end of each longitudinal core is received in a corresponding opening in the second core retaining plate.

5. The mouthpiece according to claim 1, wherein the second core retaining plate comprises a flange section adjoining the mouthpiece frame on the outside and an introduction section which is complementary to the frame opening and introduced into said frame opening.

6. The mouthpiece according to claim 1, wherein the upstream end of the frame opening comprises a step which a receiving section is defined, in which the first core retaining plate is received at least in certain areas.

7. The mouthpiece according to claim 1, wherein the first core retaining plate has a plurality of molding compound passage openings arranged around a holding section of a longitudinal respective core, and the plurality of molding compound passage openings have an opening a cross section that tapers along a flow direction of the molding compound through the first core retaining plate.

8. The mouthpiece according to claim 1, wherein the first core retaining plate has a plurality of molding compound passage openings arranged around a holding section of a respective longitudinal core, and molding compound passage openings arranged relatively close to an edge of the first core retaining plate have a smaller cross-sectional area than molding compound passage openings arranged relatively far from the edge of the first core retaining plate.

9. The mouthpiece according to claim 1, wherein the longitudinal cores are conical at least in sections, in such a manner that the cross-sectional area thereof increases viewed in flow direction of the molding compound.

10. The mouthpiece according to claim 1, wherein the longitudinal cores have a round, polygonal, triangular, quadrangular, pentagonal, hexagonal, square, flat rectangular, or trapezoidal cross section.

11. The mouthpiece according to claim 1, wherein the longitudinal cores are arranged regularly distributed on the first core retaining plate within a section which is at least approximately circular, circular segment-shaped, trapezoidal or rectangular.

12. The mouthpiece according to claim 1, wherein the downstream end of each longitudinal core is received in a corresponding opening in the second core retaining plate.

13. A mouthpiece, comprising:
   a frame;
   a first plate;
   a second plate; and
   a plurality of cores,
   wherein:
      the frame is between the first and second plates;
      the first plate is fastened to an upstream end of an opening of the frame;
      each core has an upstream end and a downstream end opposite its upstream end;
      the upstream end of each core is held by the first plate;

the downstream end of each core is radially fixed to the second plate; and the second plate is axially movable relative to each core by extrusion material during extrusion.

14. The mouthpiece of claim 13, wherein the opening of the frame has a downstream end which is opposite the upstream end of the opening of the frame, and the second plate is on the downstream end of the opening of the frame.

15. The mouthpiece of claim 13, wherein the upstream end of each core is rigidly connected to the first plate.

16. The mouthpiece of claim 13, wherein the downstream end of each core is received in a corresponding opening in the second plate.

17. The mouthpiece of claim 13, wherein:
the second plate comprises a plurality of openings; and
the downstream end of each core is received within a corresponding opening of the second plate.

18. The mouthpiece of claim 13, wherein:
the second plate comprises a plurality of openings; and
the downstream end of each core is received within a corresponding opening of the second plate.

19. The mouthpiece of claim 13, wherein:
each core has a holding section;
the first plate has a plurality of openings; and
for each core, its holding section is within a corresponding opening in the first plate.

20. The mouthpiece of claim 19, wherein:
the first plate has an edge;
the plurality of openings in the first plate comprises a first group of openings and a second group of openings;
the openings in the first group are closer to the edge of the first plate than are the openings in the second group; and
a cross-section of the openings in the first group are smaller than a cross-section of the openings in the second group.

* * * * *